United States Patent
Chang

(10) Patent No.: US 10,289,593 B1
(45) Date of Patent: May 14, 2019

(54) HARDWARE RESOURCE EXPANSION SYSTEM CAPABLE OF ASSIGNING HARDWARE ADDRESSES AUTOMATICALLY

(71) Applicants: Inventec (Pudong) Technology Corp., Shanghai (CN); Inventec Corporation, Taipei (TW)

(72) Inventor: Po-Chung Chang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 15/863,968

(22) Filed: Jan. 7, 2018

(30) Foreign Application Priority Data

Oct. 24, 2017 (CN) .......................... 2017 1 1000147

(51) Int. Cl.
| | | |
|---|---|---|
| G06F 13/38 | (2006.01) | |
| G06F 13/40 | (2006.01) | |
| G06F 13/16 | (2006.01) | |
| G06F 13/42 | (2006.01) | |

(52) U.S. Cl.
CPC ........ *G06F 13/404* (2013.01); *G06F 13/1673* (2013.01); *G06F 13/4022* (2013.01); *G06F 13/4081* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 6,038,680 A | * | 3/2000 | Olarig | G06F 11/1044 714/6.1 |
| 6,178,469 B1 | * | 1/2001 | Hennessy | G06F 13/409 710/303 |
| 6,505,305 B1 | * | 1/2003 | Olarig | G11C 29/76 714/5.11 |
| 6,571,360 B1 | * | 5/2003 | Drogichen | G06F 11/2733 714/40 |
| 6,760,869 B2 | * | 7/2004 | Lam | G06F 11/0727 714/42 |
| 6,901,531 B2 | * | 5/2005 | Gilbert | G06F 9/4405 714/5.11 |
| 6,948,021 B2 | * | 9/2005 | Derrico | G06F 1/18 710/301 |
| 7,000,053 B2 | * | 2/2006 | Ho | G06F 13/4081 710/301 |
| 7,466,704 B2 | * | 12/2008 | Kalkunte | H04L 43/00 370/392 |

(Continued)

*Primary Examiner* — Cheng Yuan Tseng
(74) *Attorney, Agent, or Firm* — Winston Hsu

(57) ABSTRACT

A hot swap management device includes a bus buffer, a hot swap switch, and a controller. The bus buffer is selectively coupled to a host system management bus of a server. The hot swap switch is coupled to the bus buffer and a hardware expansion device. The controller is coupled to the bus buffer and the hot swap switch. When the hot swap management device is coupled to a board system management bus of the server, the controller assigns a hardware address to the bus buffer. A computational unit of the server controls the hardware expansion device through the host system management bus according to the hardware address.

10 Claims, 2 Drawing Sheets

(56) References Cited

U.S. PATENT DOCUMENTS

| | | | |
|---|---|---|---|
| 7,685,348 B2* | 3/2010 | Larson | G06F 13/4081 710/100 |
| 9,013,200 B2* | 4/2015 | Woodward | G06F 1/26 324/759.01 |
| 9,456,515 B2* | 9/2016 | Pecone | H05K 13/00 |
| 9,582,373 B2* | 2/2017 | Zellermayer | G06F 11/1438 |
| 9,582,453 B2* | 2/2017 | Maroney | G06F 13/4068 |
| 9,690,744 B2* | 6/2017 | Fujiwara | G06F 13/4081 |

\* cited by examiner

HARDWARE RESOURCE EXPANSION SYSTEM CAPABLE OF ASSIGNING HARDWARE ADDRESSES AUTOMATICALLY

BACKGROUND OF THE INVENTION

1. Field of the Invention

This invention is related to a hardware resource expansion system, and more particularly, is related to a hardware resource expansion system capable of assigning hardware addresses automatically.

2. Description of the Prior Art

As cloud computing being applied to more and more fields, the data center tends to arrange different types of resources into different resource pools. For example, the resources may be classified as computing resource, storage resource and network resource, and different types of resources can be connected by data buses, such as Peripheral Component Interconnect Express (PCIE) buses. Consequently, the hardware design can be more flexible and extensible.

For example, when the server requires more storage space, the data center may buy some storage devices, and the server can be connected to the new storage devices through PCIE buses to meet the requirement of storage. However, in prior art, since the computational unit of the server usually uses one single system management bus (SMBus) to manage the devices plugged into and unplugged from the PCIE slots, the hardware addresses for the PCIE slots should be different so the hardware devices can be controlled by the same SMBus. In practical, to set up hardware addresses for the PCIE slots, the pins of hardware devices or PCIE slots have to be adjusted by manually, or additional circuits have to be added. Therefore, hardware design becomes more complicate, and the burdens of labors become heavier, lowering the efficiency of the management of the datacenter.

SUMMARY OF THE INVENTION

One embodiment of the present invention discloses a hardware resource expansion system. The hardware resource expansion system includes a server, a first set of auxiliary signal cables, a first set of PCIE transmission cables, a first hardware expansion device, and a first hot swap management device.

The server includes a computational unit and a baseboard management controller. The computational unit is coupled to a host system management bus and a plurality of peripheral component interconnect express (PCIE) buses. The baseboard management controller is coupled to the computational unit and a plurality of board system management buses.

The first set of auxiliary signal cables includes a first set of system management bus cables and second set of system management bus cables. The first set of system management bus cables are selectively coupled to the host system management bus, and the second set of system management bus cables are selectively coupled to a first board system management bus of the plurality of board system management buses.

The first set of PCIE transmission cables are selectively coupled to a first PCIE bus of the plurality of PCIE buses.

The first hot swap management device is coupled to the first hardware expansion device and the first set of auxiliary signal cables, and the first hot swap management device includes a first bus buffer, a first hot swap switch, and a first controller.

The first bus buffer is coupled to the first set of system management bus cables of the first set of auxiliary signal cables. The first hot swap switch is coupled to the first bus buffer and the first hardware expansion device. The first controller is coupled to the second set of system management bus cables of the first set of auxiliary signal cables, the first bus buffer, and the first hot swap switch. The first controller assigns a first hardware address to the first bus buffer when the second set of system management bus cables of the first set of auxiliary signal cables is coupled to the first board system management bus.

The computing unit controls the first hardware expansion device through the first set of system management bus cables of the first set of auxiliary signal cables according to the first hardware address.

Another embodiment of the present invention discloses a hot swap management device. The hot swap management device includes a bus buffer, a hot swap switch, and a controller.

The bus buffer is selectively coupled to a host system management bus of a server. The hot swap switch is coupled to the bus buffer and a hardware expansion device. The controller is coupled to the bus buffer and the hot swap switch, and the controller assigns a hardware address to the bus buffer when the hot swap management device is coupled to a board system management bus of the server.

A computational unit of the server controls the hardware expansion device through the host system management bus according to the hardware address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
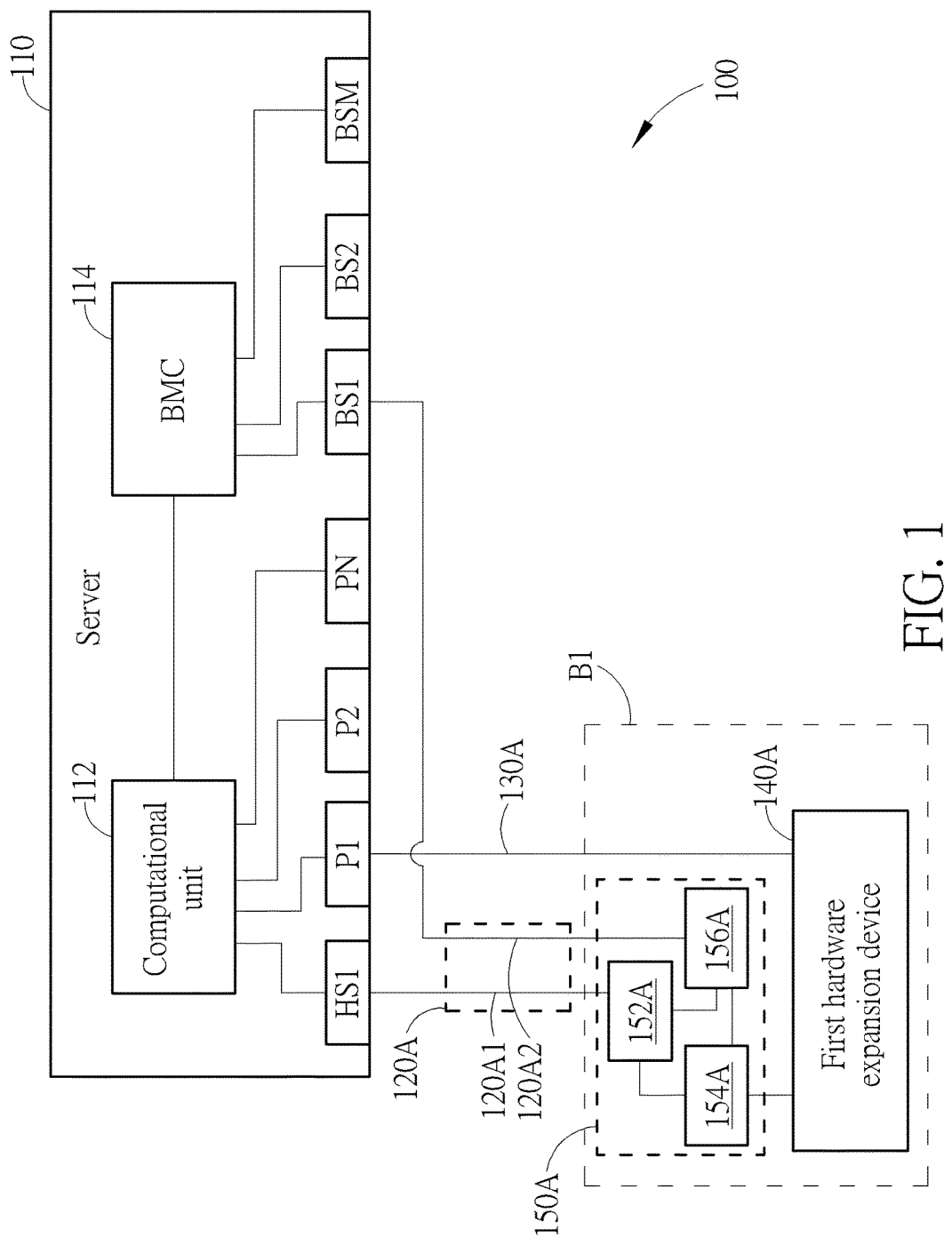
FIG. 1 shows a hardware resource expansion system according to one embodiment of the present invention.

FIG. 1 shows a hardware resource expansion system 100 according to one embodiment of the present invention. The hardware resource expansion system 100 includes a server 110, a first set of auxiliary signal cables 120A, a first set of PCIE transmission cables 130A, a first hardware expansion device 140A, and a first hot swap management device 150A.

The server 110 includes a computational unit 112 and a baseboard management controller (BMC) 114. The computational unit 112 can be a processor having computing power, including a single-cored or multi-cored processor. The computation unit 112 can be coupled to a host system management bus (SMBus) HS1 and N PCIE buses P1 to PN, where N is an integer greater than 1. The server 110 can control the hardware expansion devices coupled to the PCIE buses P1 to PN through the host SMBus HS1. For example, the PCIE buses P1 to PN can be coupled to different hardware expansion devices, such as disc array and general purpose graphic processing unit (GPGPU) array. When the hardware expansion devices are coupled to the PCIE buses P1 to PN, the server can use the host SMBus HS1 to check the statuses of the hardware expansion devices to see if the connections have been properly established, the power has been turned on, or the devices are to be unplugged. Therefore, the server 110 can establish or terminate the communications connection between the hardware expansion devices and the PCIE buses P1 to PN according to the statuses detected by the host SMBus HS1.

The BMC 114 can control other devices on the board of the server 110, such as temperature sensors and fans, for reducing the burden of the computational unit 112 and ensuring the server 110 to function properly. Since the BMC 114 is used to control many devices, the BMC 114 is usually equipped with more SMBuses. In FIG. 1, the BMC 114 can be coupled to the computational unit 112 and M board SMBuses BS1 to BSM, where M is an integer greater than 1.

In some embodiments, the server 110 can be coupled to the external hardware expansion devices through the auxiliary signal cables and PCIE transmission cables. For example, in FIG. 1, the first set of auxiliary signal cables 120 and the first set of PCIE transmission cables 130A can be selectively coupled to the server 110, that is, the first set of auxiliary signal cables 120 and the first set of PCIE transmission cables 130A can be plugged into or unplugged from the server 110 according to system requirements.

The first set of auxiliary signal cables 120A can transmit the signals required for controlling the hardware expansion devices, for example, the first set of auxiliary signal cables 120A can include a first set of SMBus cables 120A1 and a second set of SMBus cables 120A2. The first set of SMBus cables 120A1 can be selectively coupled to the host SMBus HS1 as the first set of auxiliary signal cables 120A while the second set of SMBus cables 120A2 can be selectively coupled to a first board SMBus BS1 of the board SMBuses BS1 to BSM as the first set of auxiliary signal cables 120A.

In addition, the first set of PCIE transmission cables 130A can be selectively coupled to a first PCIE bus P1 of the PCIE buses P1 to PN.

In FIG. 1, although the first set of SMBus cables 120A1, the second set of SMBus cables 120A2, and the first PCIE transmission cables 130A are represented by single lines, they may include more than one signal cable, and the number of cables may be related to the type of bus and the transmission standards used by the system. For example, the first set of SMBus cables 120A1 can include two cables: the data cable and the clock cable, required by the SMBus transmission, and the first set of PCIE transmission cables 130A can include, for example but not limited to, four signal cables.

In some embodiments, the first set of auxiliary signal cables 120A and the first set of PCIE transmission cables 130A can be bundled together, and the connection port disposed on the server 110 can be designed to correspond to the signal cables of the first set of auxiliary signal cables 120A and the first set of PCIE transmission cables 130A, making the connection even easier for users. Consequently, the user only needs to plug the bundled cables into the corresponding port of the server 110, and the first set of SMBus cables 120A1 will be coupled to the host SMBus HS1, the second set of SMBus cables 120A2 will be coupled to the first board SMBus BS1, and the first set of PCIE transmission cables 130A will be coupled to the first PCIE bus P1.

In some embodiments, the first set of auxiliary signal cables 120A may further include other signal cables, such as the reference clock signal cable and the reset signal cable for PCIE transmission.

The first hardware expansion device 140A can be used by the server 110 as an external hardware expansion device, and can provide the required hardware resource to the server 110. For example, the first hardware expansion device 140A can be memory storage device or computation resources. To allow the first hardware expansion device 140A to be plugged in or unplugged when the server 110 is under operation, the first hardware expansion device 140A and the server 110 can be connected through the first hot swap management device 150A.

The first hot swap management device 150A can be coupled to the first hardware expansion device 140A and the first set of auxiliary signal cables 120A. The first hot swap management device 150A includes a first bus buffer 152A, a first hot swap switch 154A, and a first controller 156A.

The first bus buffer 152A can be an inter-integrated circuit (I2C) bus buffer, and the first bus buffer 152A can be assigned with a hardware address and analyze the received hardware addresses for extending the number of hardware devices coupled to the I2C bus. The first bus buffer 152A can be coupled to the first set of SMBus cables 120A1 of the first set of auxiliary signal cables 120A.

The first hot swap switch 154A can be coupled to the first bus buffer 152A and the first hardware expansion device 140A. The first controller 156A can be coupled to the second set of system management bus cables 120A2 of the first set of auxiliary signal cables 120A, the first bus buffer 152A, and the first hot swap switch 154A.

When the second set of system management bus cables 120A2 of the first set of auxiliary signal cables 120A is coupled to the first board system management bus BS1, the first controller 156A can send a query to the BMC 114 through the second set of SMBus cables 120A2 for the available hardware addresses, and assign a first hardware address to the first bus buffer 152A according to the available hardware addresses provided by the BMC 114. Consequently, the computational unit 112 can control the first hardware expansion device 140 through the first set of SMBus cables 120A1 of the first set of auxiliary signal cables 120A according to the first hardware address. Furthermore, the first hot swap management device 150A can be disposed on the same baseboard B1 as the first hardware expansion device 140A, and the first hot swap management device 150A can determine the connection status between the transmission cables and the buses according to pull up resistors disposed at the connection portions of the buses.

In some embodiments, the first hardware expansion device 140A can transmit its status parameters to the computational unit 112 through the first set of SMBus 120A1 of the first set of auxiliary signal cables 120A, so the server 110 can be aware of the status of the first hardware expansion device 140A. For example, after connecting the first hardware expansion device 140 and the serve 110 with the first set of auxiliary signal cables 120A and the first set of PCIE transmission cables 130A, the user can push a notification button of the first hardware expansion device 140. In this case, the first hardware expansion device 140 can transmit the notification signal to the computational unit 112 through the first bus buffer 152A and the first set of SMBus cables 120A1 (or other predefined signal cables), and the computational unit 112 will establish the communications connection between the first set of PCIE transmission cables 130A and the first PCIE bus P1 accordingly.

Also, if the user wants to remove the first hardware expansion device 140, the user can push a removal notification button. In this case, the first hardware expansion device 140 can transmit the removal notification signal to the computational unit 112 through the first bus buffer 152A and the first set of SMBus cables 120A1, and the computational unit 112 will terminate the communications connection between the first set of PCIE transmission cables 130A and the first PCIE bus P1 accordingly.

Consequently, the server 110 can use the hardware resource provided by the first hardware expansion device 140, and the first hardware expansion device 140 can be hot plugged in or unplugged when the server 110 remains functioning.

Figure 2:
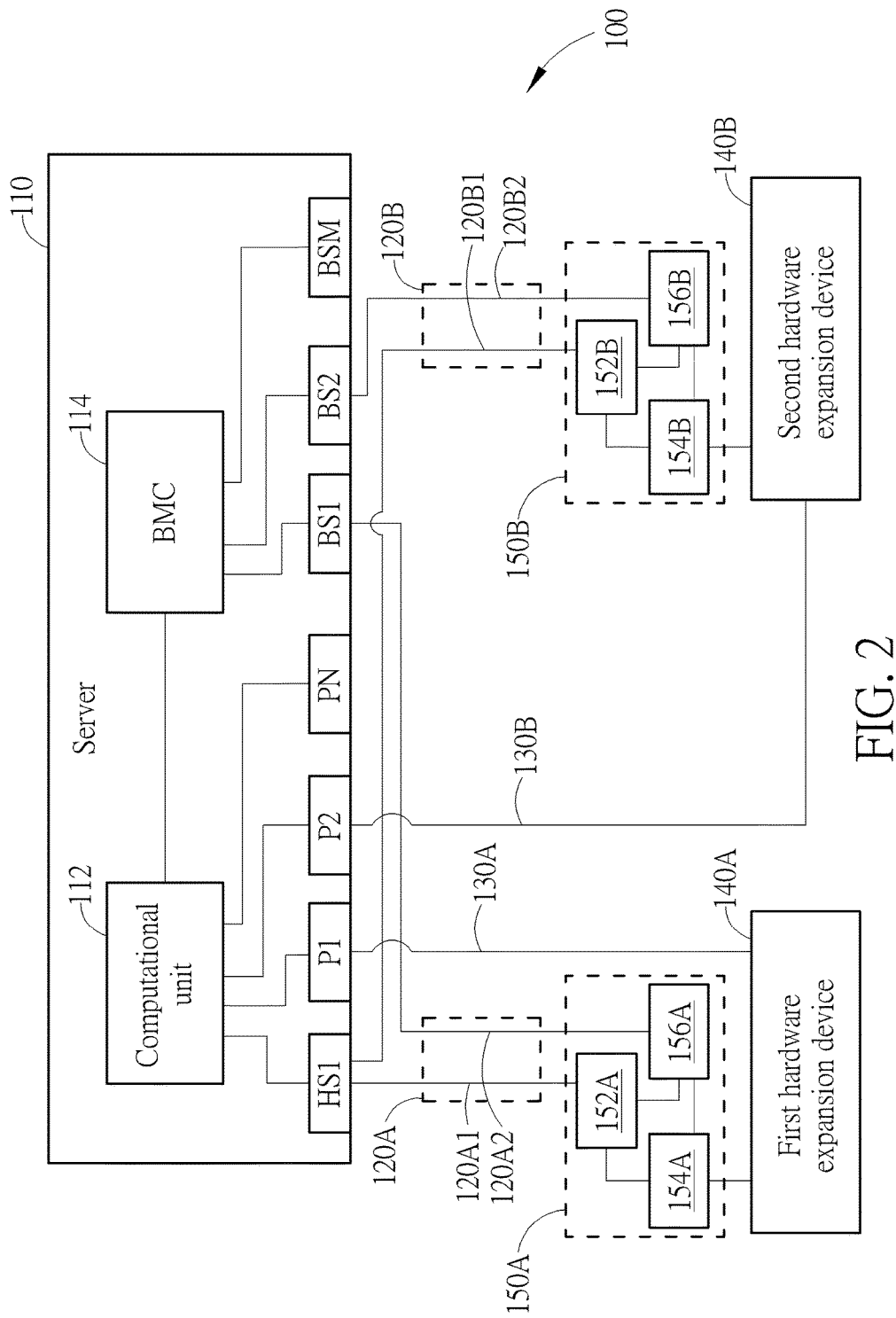
FIG. 2 shows another usage scheme of the hardware resource expansion system in FIG. 1.

FIG. 2 shows another usage scheme of the hardware resource expansion system 100. In FIG. 2, the hardware resource expansion system 100 can further include a second set of auxiliary signal cables 120B, a second set of PCIE transmission cables 130B, a second hardware expansion device 140B, and a second hot swap management device 150B.

The second set of auxiliary signal cables 120B may include a first set of SMBus cables 120B1 and a second set of SMBus cables 120B2. The first set of SMBus cables 120B1 can be selectively coupled to the host system management bus HS1, the second set of SMBus cables can be selectively coupled to a second board SMBus BS2, and the second set of PCIE transmission cables 130B can be selectively coupled to the second PCIE bus P2.

The second hot swap management device 150B is coupled to the second hardware expansion device 140B and the second set of auxiliary signal cables 120B. The second hot swap management device 150B includes a second bus buffer 152B, a second hot swap switch 154B, and a second controller 156B.

The second bus buffer 152B can be coupled to the first set of SMBus cables 120B1 of the second set of auxiliary signal cables 120B, the second hot swap switch 154B can be coupled to the second bus buffer 152B and the second hardware expansion device 140B. The second controller 156B can be coupled to the second set of SMBus cables 120B2 of the second set of auxiliary signal cables 120B, the second bus buffer 152B, and the second hot swap switch 154B.

When the second set of system management bus cables 120B2 of the second set of auxiliary signal cables 120B is coupled to the second board SMBus BS2, the controller 156B can assign a second hardware address to the second bus buffer 152B.

In some embodiments, the second controller 156B can obtain the available hardware addresses that haven't been used by other devices from the BMC 114 through the second set of SMBus cables 120B2 and the second board SMBus BS2, so the second controller 156B can assign the second hardware address accordingly. Consequently, it can be ensured that the second hardware address would be different from the first hardware address, allowing the computational unit 112 to control the first hardware expansion device 140A and the second hardware expansion device 140B through the host SMBus HS1 without setting the hardware addresses manually. Consequently, not only the operations can be simplified, but the efficiency can also be improved.

In summary, the hardware resource expansion systems and the hot swap management devices provided by the embodiments of the present invention can assign the corresponding hardware addresses when the hardware expansion devices are coupled to the servers, ensuring the server can control the hardware expansion devices individually and effectively to use the hardware resources. In other words, the hardware resource expansion systems and the hot swap management devices can assign the hardware addresses without manual setting; therefore, not only the operations can be simplified, but the efficiency can also be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hardware resource expansion system comprising:
   a server comprising:
      a computational unit coupled to a host system management bus and a plurality of peripheral component interconnect express (PCIE) buses; and
      a baseboard management controller coupled to the computational unit and a plurality of board system management buses;
   a first set of auxiliary signal cables comprising:
      a first set of system management bus cables selectively coupled to the host system management bus; and
      a second set of system management bus cables selectively coupled to a first board system management bus of the plurality of board system management buses;
   a first set of PCIE transmission cables selectively coupled to a first PCIE bus of the plurality of PCIE buses;
   a first hardware expansion device; and
   a first hot swap management device coupled to the first hardware expansion device and the first set of auxiliary signal cables, the first hot swap management device comprising:
      a first bus buffer coupled to the first set of system management bus cables of the first set of auxiliary signal cables;
      a first hot swap switch coupled to the first bus buffer and the first hardware expansion device; and
      a first controller coupled to the second set of system management bus cables of the first set of auxiliary signal cables, the first bus buffer, and the first hot swap switch, and configured to assign a first hardware address to the first bus buffer when the second set of system management bus cables of the first set of auxiliary signal cables is coupled to the first board system management bus;
   wherein the computing unit controls the first hardware expansion device through the first set of system management bus cables of the first set of auxiliary signal cables according to the first hardware address.

2. The hardware resource expansion system of claim 1, wherein the first hardware expansion device and the server establish a communications connection through the first set of PCIE transmission cables and the first PCIE bus after the first hardware address has been assigned.

3. The hardware resource expansion system of claim 1, further comprising:
   a second set of auxiliary signal cables comprising:
      a first set of system management bus cables selectively coupled to the host system management bus; and
      a second set of system management bus cables selectively coupled to a second board system management bus of the plurality of board system management buses;
   a second set of PCIE transmission cables selectively coupled to a second PCIE bus of the plurality of PCIE buses;

a second hardware expansion device; and a second hot swap management device coupled to the second hardware expansion device and the second set of auxiliary signal cables, the second hot swap management device comprising:
- a second bus buffer coupled to the first set of system management bus cables of the second set of auxiliary signal cables;
- a second hot swap switch coupled to the second bus buffer and the second hardware expansion device; and
- a second controller coupled to the second set of system management bus cables of the second set of auxiliary signal cables, the second bus buffer, and the second hot swap switch, and configured to assign a second hardware address to the second bus buffer when the second set of system management bus cables of the second set of auxiliary signal cables is coupled to the second board system management bus;

wherein:

the second hardware address is different from the first hardware address; and the computing unit controls the second hardware expansion device through the first set of system management bus cables of the second set of auxiliary signal cables according to the second hardware address.

4. The hardware resource expansion system of claim 1, wherein the first set of auxiliary signal cables and the first set of PCIE transmission cables are bundled together.

5. The hardware resource expansion system of claim 1, wherein the first hardware expansion device and the first hot swap management device are disposed on a same board.

6. A hot swap management device comprising:
- a bus buffer selectively coupled to a host system management bus of a server;
- a hot swap switch coupled to the bus buffer and a hardware expansion device; and
- a controller coupled to the bus buffer and the hot swap switch, and configured to assign a hardware address to the bus buffer when the hot swap management device is coupled to a board system management bus of the server;

wherein a computational unit of the server controls the hardware expansion device through the host system management bus according to the hardware address.

7. The hot swap management device of claim 6, wherein a PCIE connection is established between the hardware expansion device and the server after the hardware address has been assigned.

8. The hot swap management device of claim 6, wherein:
the bus buffer is selectively coupled to the host system management bus through a first set of system management bus cables of a set of auxiliary signal cables; and
the controller is selectively coupled to the board system management bus through a second set of system management bus cables of the set of auxiliary signal cables.

9. The hot swap management device of claim 8, wherein the set of auxiliary signal cables and a set of PCIE transmission cable between the server and the hardware expansion device are bundled together.

10. The hot swap management device of claim 6, wherein the hardware expansion device and the hot swap management device are disposed on a same board.

* * * * *